United States Patent [19]
Rogerson

[11] 3,765,498
[45] Oct. 16, 1973

[54] SNOWMOBILE WITH VERTICALLY ADJUSTABLE SKIS

[76] Inventor: John R. Rogerson, Main St. Box 10, Leonardville, New Brunswick, Canada

[22] Filed: Mar. 8, 1972

[21] Appl. No.: 232,778

[52] U.S. Cl. .............................................. 180/5 R
[51] Int. Cl. ...................... B62m 27/00, B62b 13/00
[58] Field of Search ........................... 180/5 R, 5 A; 280/112 A, 21, 43.23; 92/2, 117 R, 136, 165 PR

[56] References Cited
UNITED STATES PATENTS

| | | | |
|---|---|---|---|
| 3,504,752 | 4/1970 | Milward | 180/5 R |
| 2,552,549 | 5/1951 | Good | 92/165 PR |
| 2,714,331 | 8/1955 | Plante | 92/165 PR |
| 2,899,938 | 8/1959 | Gardner | 92/136 |

Primary Examiner—Richard J. Johnson
Attorney—Harvey B. Jacobson

[57] ABSTRACT

In a snowmobile of the type including rear endless track drive means and a pair of forward opposite side dirigible skis the skis are oscillatably supported from the lower free piston rod end portions of a pair of hydraulic cylinders for angular displacement relative to the cylinders about horizontal transverse axes. Suitable structure is provided for preventing rotation of the piston rod portions of the cylinders relative to the cylinder portions thereof and the cylinder portions are supported from the snowmobile chassis for angular displacement about their longitudinal axes whereby steerage of the snowmobile may be affected in the usual manner. By supporting the skis from the extendable and retractible piston portions of the cylinders the snowmobile may be leaned to the inside of a turn and in an uphill direction when traversing a slope to thereby increase the stability of the snowmobile.

5 Claims, 6 Drawing Figures

PATENTED OCT 16 1973 3,765,498

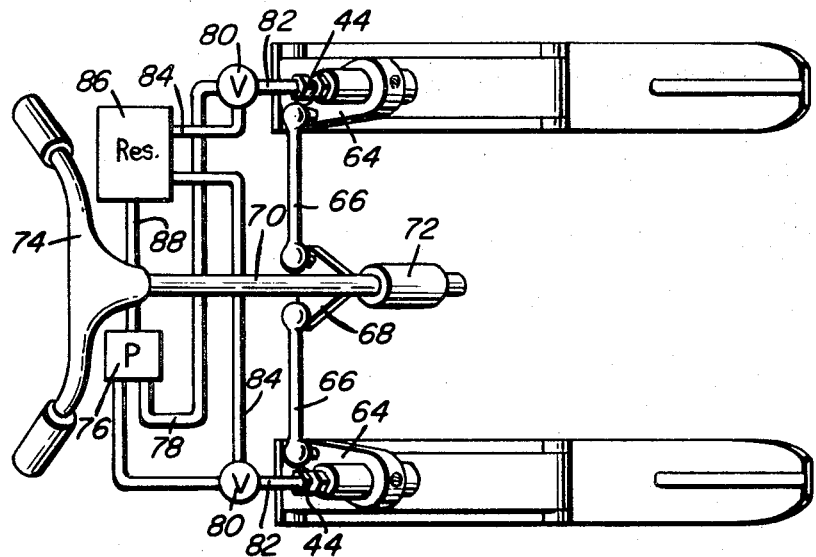
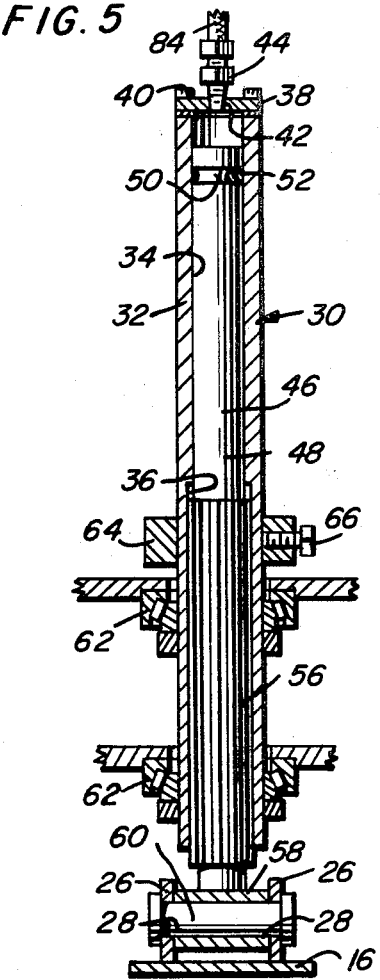
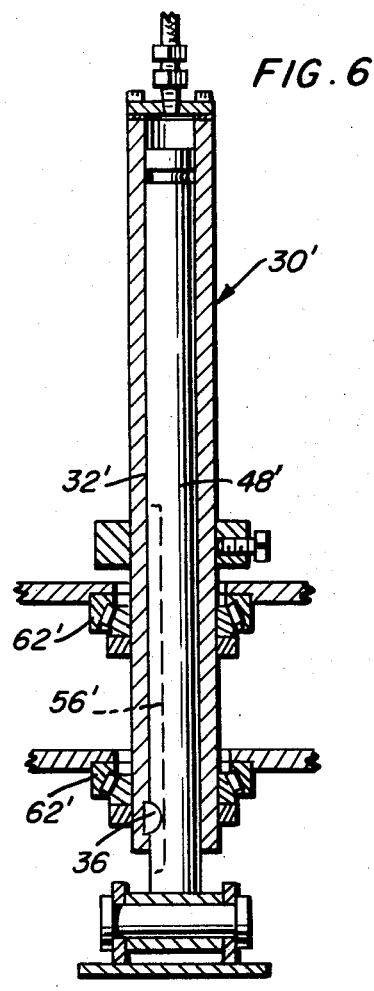

SNOWMOBILE WITH VERTICALLY ADJUSTABLE SKIS

When snowmobiling it is important to bear in mind that a snowmobile has a relatively high center of gravity and that sharp turns must be negotiated at slow speeds unless the operator and the passenger or passengers on the snowmobile lean excessively to the inside of the turn. In addition, steep slopes may not be traversed without the operator and passenger or passengers leaning in the uphill direction. While this mandatory method of operation of a snowmobile need not be resorted to frequently during casual operation of a snowmobile, more serious operation of snowmobiles involves turning at high speeds and may often require traversing very wide and steep slopes. Therefore, the operator and passenger or passengers of a snowmobile can be seriously inconvenienced by having to repeatedly lean in the uphill direction for long periods of time while traversing a wide slope.

The main object of this invention is to provide a snowmobile of the type including a pair of opposite side forward dirigible skis with the skis supported from the snowmobile chassis by means of the extendable piston rod portions of hydraulic cylinders whereby the skis may be individually vertically shifted relative to the snowmobile chassis.

Another object of this invention, in accordance with the immediately preceding object, is to provide a snowmobile modified in accordance with the present invention in a manner such that normal steerage of the snowmobile is unchanged.

Still another object of this invention is to provide a mounting structure in accordance with the preceding objects and which may be readily added to existing snowmobiles as well as incorporated into the manufacture of new snowmobiles.

A final object of this invention to be specifically enumerated herein is to provide a snowmobile in accordance with the preceding objects which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIG. 4 is a fragmentary top plan view of the front ski assemblies of the snowmobile and the steering apparatus connected thereto with the hydraulic circuit of the ski supporting hydraulic cylinder diagrammatically illustrated;

FIG. 5 is an enlarged longitudinal sectional view taken substantially along the longitudinal center lines of one of the cylinders; and FIG. 6 is an enlarged sectional view similar to FIG. 5 but illustrating a modified form of cylinder.

Figure 1:
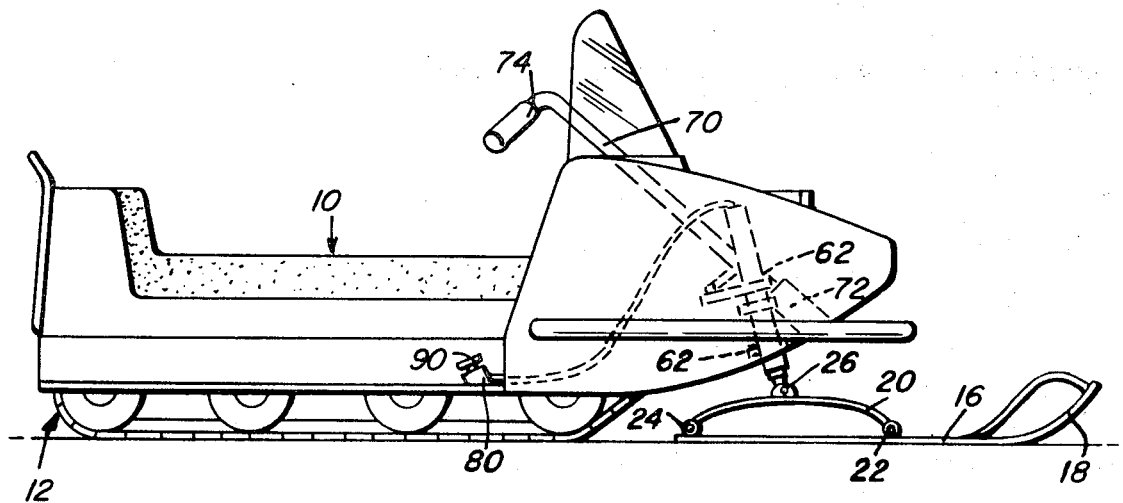
FIG. 1 is a side elevational view of a conventional form of snowmobile modified in accordance with the present invention.
Figure 2:
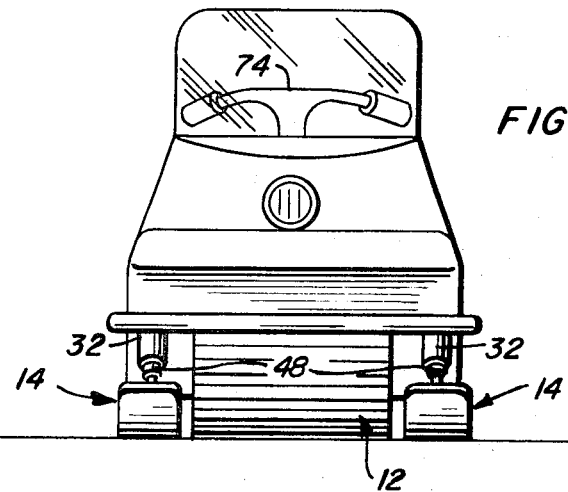
FIG. 2 is a front elevational view of the snowmobile with the front skis thereof vertically spaced relative to the snowmobile chassis in a manner so as to position the snowmobile in an upright position when on level ground.
Figure 3:
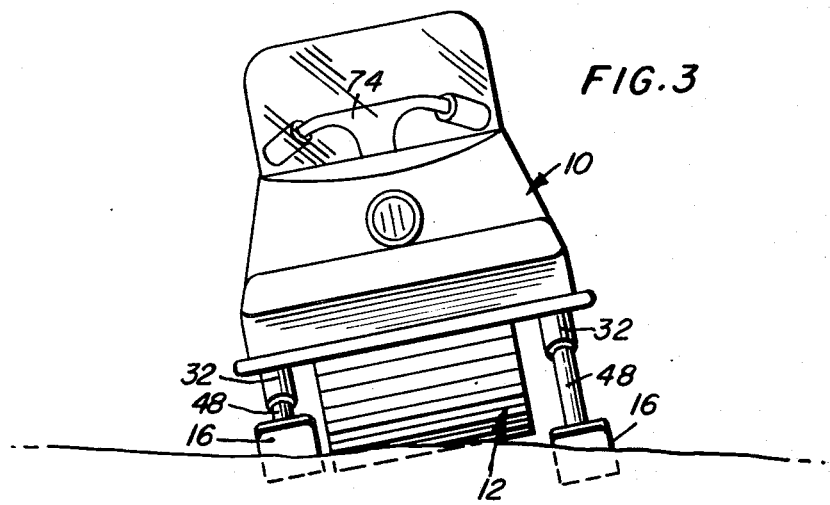
FIG. 3 is a front elevational view of the snowmobile illustrating the manner in which one of the front skis thereof may be displaced downwardly relative to the snowmobile chassis in order to incline the snowmobile relative to the horizontal while on horizontal ground.

Referring now more specifically to the drawings the numeral 10 generally designates a conventional form of snowmobile including a rear endless drive track assembly referred to in general by the reference numeral 12 and a pair of front ski assemblies referred to in general by the reference numeral 14.

The ski assemblies 14 each consist of a ski member 16 having a forwardly and upwardly curving front end 18 and provided with a downwardly opening bowed spring 20 having its opposite ends connected to the upper surface of the ski member 16 as at 22 and 24. The midportion of the spring 20 includes a pair of upstanding opposite side mounting ears 26 provided with aligned bores 28. Eack ski assembly 14 additionally includes a hydraulic cylinder referred to in general by the reference numeral 30 consisting of a cylinder portion 32 disposed in upstanding position and open at its lower end. The upper end of the cylinder portion 32 defines a smooth longitudinal and cylindrical bore 34 and the lower end of the bore 34 opens into a splined counterbore 36 extending through the lower portion of the cylinder portion 32. The lower end of the counterbore 36 opens outwardly of the bottom of the cylinder portion 32 and the upper end of the bore 34 is closed by means of an upper end plate 38 secured over the upper end of the cylinder portion 32 by means of removable fasteners 40. The end plate 38 is provided a central opening 42 in which an inlet fitting 44 is threadedly secured.

The upper smooth cylindrical end 46 of an upstanding piston rod portion 48 is slidingly telescoped into the bore 34 and has an upper end circumferential groove 50 formed therein in which a sealing ring 52 is seated. The lower end 54 of the piston rod portion 48 is splined as at 56 and keyed into the splined counterbore 36.

The lower end of each piston rod portion 48 projects downwardly from the lower end of the corresponding cylinder portion 32 and has a transverse sleeve 58 secured thereto receivable between the corresponding apertured mounting ears 26. A pivot fastener 60 is secured through each pair of apertured mounting ears 26 and the corresponding transverse sleeve 58 whereby each ski member 16 is spring supported from its corresponding hydraulic cylinder for up and down shifting with the corresponding piston rod portion 48 relative to the associated cylinder portion 32.

Each hydraulic cylinder 30 is supported from the chassis of the snowmobile 10 by means of vertically spaced combined thrust and journal bearing assemblies 62 and accordingly, the ski members 16 are mounted in dirigible fashion for steering the snowmobile 10, as is conventional.

Each of the cylinder portions 32 has one end of a steering arm 64 mounted thereon by means of a setscrew 66 and the free ends of the steering arms 64 have remote ends of a pair of tie rods 66 pivotally secured thereto. The remote ends of the tie rods 66 are pivotally attached to a steering arm 68 carried by the steering column 70 of the snowmobile 10 and the column 70 is supported from the snowmobile chassis by means of a conventional bearing assembly 72.

The upper end of the steering column 70 is provided with the conventional handle bar assembly 74 and thus it may be seen that the snowmobile 10 may be steered in the conventional manner. However, with attention now invited more specifically to FIG. 4 of the drawings, it may be seen that there is pro-vided a hydraulic pump 76 to which a pair of pressure lines 78 are connected. The ends of the lines 78 remote from the pump 76 open into the inlet ports of a pair of manually actuatable valves 80 which are of the two way type. A combined pressure and return line 82 extends between each valve 80 and the corresponding inlet fitting 44 and a pair of return lines 84 extend from the valves 80 to the reservoir 86 from which hydraulic oil is supplied to the pump through a supply line 88.

The pump 76 may be driven from the engine (not shown) of the snowmobile 10 and the valves 80 may be provided with actuators 90 and positioned on opposite sides of the snowmobile 10 for foot actuation in the manner illustrated in FIG. 1 of the drawings. In addition, the pump 76 may be of the manually operable type, although if a manual pump is utilized vertical adjustment of the ski assemblies 14 would be substantially limited to adjustment of the ski assemblies for the purpose of traversing a wide steep slope inasmuch as there would not be sufficient time in which to manually generate sufficient hydraulic pressure in order to execute a sudden turn with the snowmobile tilted to the inside of the turn. The pump 76 may be of any conventional type such as that utilized for power steering purposes on conventional motor vehicles and the valves 80 may be of the type wherein the actuators 90 thereof may be depressed on one occasion to open the lines 78 to the lines 82 and on a subsequent occasion to open the lines 82 to the lines 84. Of course, it is to be appreciated that the valves 80 are actuatable independently of each other.

With attention now invited more specifically to FIG. 6 of the drawings there may be seen a modified form of hydraulic cylinder referred to in general by the reference numeral 30'. The hydraulic cylinder 30' is quite similar to the hydraulic cylinder 30 and differs from the latter only in that instead of the piston rod portion 48' thereof being splined and the cylinder portion 32' thereof being provided with splined counterbore, the piston rod portion 32' is provided with a key 36' and the piston rod portion 48' is provided with a keyway 56' in which the key 36' is slidingly received.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a snowmobile including a chassis, rear ground engaging drive means supported from said chassis, the forward end portion of said chassis including laterally spaced opposite side ski means, support means supporting said ski means from said chassis for like angular displacement about upstanding axes and independent shifting in up and down directions relative to said chassis, steering means connected between said chassis and said ski means for selectively oscillating said ski means in unison about said axes, force means connected between each of said ski means and said chassis for selectively downwardly shifting said ski means relative to said chassis, said support means including a pair of upstanding fluid motors each including a cylinder portion and a piston rod portion extendible and retractable relative to said cylinder portion, said cylinder portions being journaled from said chassis for oscillation about said upstanding axes and against axial shifting relative to said chassis, said piston rod portions being extendible and retractable relative to the lower ends of said cylinder portions, said ski means being supported from the lower end portions of said piston rod portions, said steering means being operatively connected between said cylinder portions and said chassis for selectively oscillating the former relative to the latter about said axes, said steering means including means slidably keying said piston rod portions to the corresponding cylinder portions for oscillation therewith, said force means comprising fluid inlet and outlet means communicating the interiors of the upper end portions of said cylinder portions with the exteriors of said cylinder portions, whereby fluid under pressure may be supplied to and vented from the interior of each cylinder portion so as to downwardly extend and allow upward retraction of, respectively, the corresponding piston rod portion.

2. The combination of claim 1 wherein said means keying said piston rod portions to said cylinder portions comprise splined connections between said piston rod and cylinder portions.

3. The combination of claim 1 wherein said means keying said piston rod portions and cylinder portions together comprises a key carried by one of said portions and a keyway formed in the other of said portions in which said key is slidably received.

4. The combination of claim 1 wherein each of said ski means comprises a generally horizontally disposed ski member including a forwardly and upwardly curving forward end portion, said ski means being supported from the lower end portions of said piston rod portions for oscillation relative thereto about horizontal axes extending transversely of said piston rod portions and said ski means.

5. The combination of claim 4 including a pair of generally horizontal downwardly opening arcuate leaf springs, the midportions of said leaf springs being supported from the lower ends of said shaft portions and the free ends of said leaf springs being secured to said ski members at points spaced longitudinally therealong.

* * * * *